W. W. DEAN.
FRICTIONAL GOVERNOR.
APPLICATION FILED JUNE 2, 1919.
1,349,050.
Patented Aug. 10, 1920.
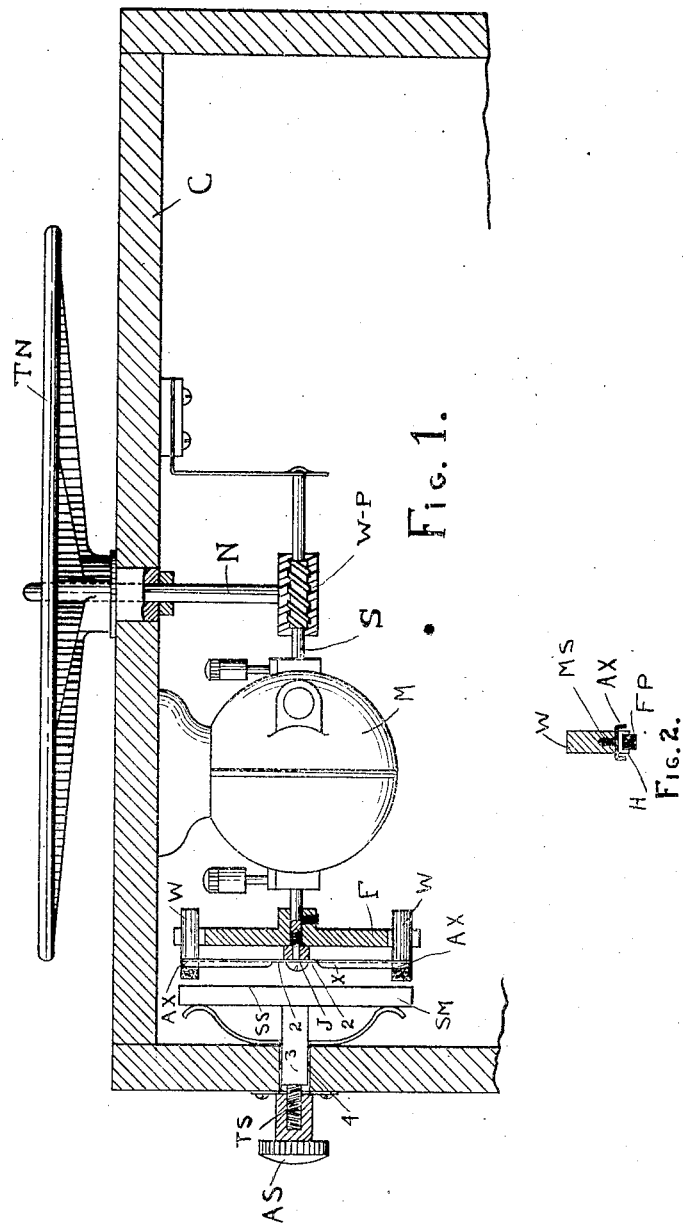
INVENTOR
W. W. DEAN.
BY Frank M. Slough.
ATTORNEY

UNITED STATES PATENT OFFICE.

WILLIAM W. DEAN, OF WILMETTE, ILLINOIS, ASSIGNOR TO EFFICIENCY ELECTRIC CORPORATION, OF NEW YORK, N. Y., A CORPORATION OF NEW YORK.

FRICTIONAL GOVERNOR.

1,349,050.      Specification of Letters Patent.      Patented Aug. 10, 1920.

Application filed June 2, 1919. Serial No. 301,171.

*To all whom it may concern:*

Be it known that I, WILLIAM W. DEAN, a citizen of the United States, residing at Wilmette, in the county of Cook and State of Illinois, have invented certain new and useful Improvements in Frictional Governors; and I do hereby declare the following to be a full, clear, concise, and exact description of the invention, such as will enable those skilled in the art to which it appertains to make and use the same.

My invention relates to frictional governors, and more particularly to such a governor as may be used in connection with motors required to be operated at a very constant rate of speed, such as phonograph motors and the like, although I may employ the system of my invention in whole or in part wherever such a system or a portion of the same finds a use.

It has been previously proposed to control the speed of phonograph motors and the like, by the use of frictional governors and I do not therefore claim the use of frictional governors broadly, as my invention; but such frictional governors as heretofore proposed have been faulty in operation, there being generally a very perceptible elapsed time between speed changes in the motor controlling such governors and the response by the governors, in a constant correction of such speed variations by the governor.

Also it has been found in using such frictional governors as have been heretofore proposed, that when once operated and their corrective effect realized by a reduction in the motor speed, that they do not immediately return to a non-effective position, a binding very often being produced between the moving parts and a time interval follows in which the motor speed is very noticeably reduced before the governor returns to its ineffective position and the speed again accelerated.

Such governors usually are of such a form requiring a slidable member or members carrying weights having considerable mass and consequent inertia, also these prior constructions are unduly expensive to manufacture, when designed to give reliable results.

In present invention therefore I have designed a structure wherein the above mentioned common troubles have been eliminated to the greatest possible degree, there being no noticeable time lag as above described, and consequently no noticeable pulses of motor speed produced, cause and effect operating continually, there being frequent cycles of speed retardation and speed acceleration at all times, within very narrow limits, the desired effect thereby being of maintaining a very constant motor and therefore a very constant phonograph turn-table speed; at the same time the device of my invention is comparatively simple and inexpensive to construct.

In my present invention I do away with all slidable members, arranging the parts in such a way that there can be no "binding" when the frictional brake is applied to retard the speed of the motor or when the brake is released to cause the motor to accelerate, there being no noticeable time period between an acceleration of the motor speed and the operation of the frictional members to retard such a speed.

My invention will perhaps be better understood by reference to the drawing accompanying this specification, and other objects of my invention not specifically above pointed out will be thereby made apparent.

In Figure 1, I show portions of a phonograph, such as a casing C, a phonograph record supporting turn-table TN, driven by means of a motor M, which may be an electric or a spring motor, by means of a motor shaft S, worm and gear members W—P, and a turn-table shaft N. To the other end of the shaft S is attached a flywheel F, which by its inertia subdues rapid variations in motor speed. Also attached to the shaft S, is a member X comprising a plurality of arms AX, which may be of any desired number.

In Fig. 2, I show the member X comprising a unitary structure, the same being stamped out of spring steel, the arms AX carrying at their outer extremities friction pads FP, which when the motor governor is in operation engage, as illustrated in Fig. 1, a stationary surface SS, which preferably as illustrated in Fig. 1, is made adjustable toward and from the rotating felt pad members. The member X is made of steel leaf spring with the grain of the rolled steel disposed lengthwise of the spring.

In practice I prefer to employ the plurality of the members X although for the sake of simplicity of disclosure only one having 2 arms AX is shown in the drawing.

As illustrated in the Figs. 1 and 2 each of the arms AX of the members X is weighted at its free end by a carried weight W. Each of the arms AX of the member X is preferably ribbed for the greater portion of its length extending away from the point of support J, a certain flexibility being retained at the unribbed portion 2, each of the weights W being secured to the ribbed ends by a machine screw MS, which passes through a hole in the arm AX to engage internally threaded recess in the weight W, the machine screw MS has a recessed head H into the recess of which is forced the friction pad FP which is composed of leather, fiber, felt or other suitable friction material.

As illustrated in Fig. 1, I support the spring reed governing member X at its mid portion on the motor shaft S, although it is understood that it might be carried by any rotating shaft driven by the motor instead of by the main motor shaft, such expedients being common in this art.

In order to adjust the stationary member SM, so as to move its stationary surface SS to and from the rotating frictional pads FP so as to permit the adjustment of the motor to operate at different desired speeds, I support the stationary friction surface member on a stem, 3 placed in a guiding hole 4 and provide for the stem 3 of the stationary member a screw threaded end TS projecting into an internal thread of an adjusting screw AS, placed on the side of the casing C and having a manually rotatable knob AS, adapted to be turned by an operator to adjust the speed of the motor. By this arrangement I produce the effect, when the knob AS is rotated by the operator, of longitudinally displacing the stationary member SS, so that any desired adjustment of the frictional stationary surface SS, of the member SM with reference to the frictional pads FP may be had.

The center of mass of each of the weights W, carried by one of the arms XA of the reed governer springs, is with reference to the point of spring support, J, so placed that a line extending between the said center of mass and the said point of support, would be in a plane extending at an angle to the plane of rotation, so that when the motor is speeded up by centrifugal force the center mass of the weights tends to come more and more nearly into such a plane depending upon the motor speed, and in response to the movement of the weights, the pads FP will be brought into contact with the fixed surface SS, the contact pressures produced being in proportion to the speed of the motor and proportionally retarding such motor speed.

In practice, the effect produced is of a constant rubbing of the felt pads FP against the surface SS of the member SM, the pressure between the felt pads and the surface SS varying in accordance with the regulating effect of the governor upon the motor speed. I have found that a reed governor so constructed and described is very quick acting has none of the defects above mentioned, as are inherent in governors of the frictional type heretofore employed in this art; at the same time, the governor of my invention can be manufactured much more cheaply than most of the governors heretofore employed in the art, though producing a greatly superior result.

I am aware that numerous and extensive departures may be made from the embodiment of my invention illustrated and described herein, but what I claim as my invention is defined in the following claims:—

1. In a friction governor, the combination with a rotator, of a reed spring secured at only one end to the rotator and having its free end extending radially from the supporting shaft, a friction pad and a centrifugal weight secured to the end of the said spring, the center of mass of the weighted spring when the rotator is at rest being disposed at an angle, with reference to the point of spring support, to the radial plane of the said shaft, and a stationary friction surface adapted to be engaged by the said pad when the said rotator is rotated at a predetermined speed.

2. In a friction governor, the combination with a rotatable shaft, of a reed spring extending radially from the supporting shaft, a friction pad and a centrifugal weight secured to the end of the said spring, said reed spring having a flexible portion adjacent to the point of support thereof and a stiffened portion, the center of mass of the weighted spring with reference to the point of spring support, when the rotator is at rest being disposed at an angle to the plane of rotation of the said rotator, and a stationary friction surface adapted to be engaged by the said pad when the said rotator is rotated at a predetermined speed.

3. In a friction governor, in combination with a rotatable shaft, of a reed spring secured to an end of the said shaft and having its free end extending radially from the supporting shaft, a friction pad and a centrifugal weight removably secured to the end of the said reed spring, the said weight being so disposed as to be moved by the rotating shaft to flex the supporting reed spring, and a stationary friction member located in a plane parallel to the radial plane of said shaft, and adapted to be engaged by the said pad when the said spring is flexed.

4. In a friction governor, in combination with a rotatable shaft, of a spring member secured to the said shaft and having a plurality of free arms extending radially from the supporting shaft, a friction pad and a centrifugal weight secured to each arm end, a stationary friction member, said arms being adapted to be flexed according to the speed of the said rotating shaft to cause said pads to engage the said stationary friction member.

5. In a friction governor, in combination with a rotatable shaft, a reed secured to the said shaft at one end and a weight secured to the other end of the said reed, the said reed extending radially from the supporting shaft and being adapted to be flexed according to the speed of rotation of the said shaft and a stationary friction disk one face of which is adapted to make frictional contact with the free end of the said reed when the said reed is flexed to control the speed of the said rotating shaft.

6. In a friction governor, in combination with a rotatable shaft, of a spring member secured to the said shaft and having a plurality of free arms extending radially from the supporting shaft, a centrifugal weight secured to each arm end, a stationary friction disk, said arms being adapted to be flexed according to the speed of the said rotating shaft to cause frictional contacts between the said arm ends and a face of the said stationary friction disk.

7. In a friction governor, in combination with a rotatable shaft, of a reed spring secured to an end of the said shaft, and having its free end extending radially from the said supporting shaft, a centrifugal weight secured to the said reed spring, the said weight being so disposed as to be moved by the power of centrifugal force when the said shaft is rotated to flex the supporting reed spring, and a stationary friction disk having a face adapted to make frictional contact with the said reed spring when flexed.

8. In a friction governor, in combination with a rotatable shaft, of a reed spring extending radially from and carried by the said shaft, a centrifugal weight secured to the reed spring, the said reed spring being secured at only one end to a support, a friction contact disk adapted to be adjustably moved in line with the said shaft, said weight being caused to flex the supporting reed spring to make frictional contact with the said disk with a pressure depending upon the speed of rotation.

9. In a friction governor, in combination with a rotatable shaft, of a plurality of reed springs carried by the said shaft, a centrifugal weight secured to each reed spring, the reed springs being secured to the said shaft at only one end, each of the said reed springs extending radially of the supporting shaft, a friction disk lying in the radial plane of said shaft and adjustably movable in a line with the said shaft, the said weights being so disposed as to variably flex their carrying springs in accordance with the speed of rotation to make variable contact pressure between a face of the said disk and the said springs.

In witness whereof, I hereunto subscribe my name this 28 day of May A. D. 1919.

WILLIAM W. DEAN.